(12) United States Patent
Bournelle et al.

(10) Patent No.: US 9,532,218 B2
(45) Date of Patent: Dec. 27, 2016

(54) IMPLEMENTING A SECURITY ASSOCIATION DURING THE ATTACHMENT OF A TERMINAL TO AN ACCESS NETWORK

(71) Applicant: Orange, Paris (FR)

(72) Inventors: Julien Bournelle, Paris (FR); Lionel Morand, Malakoff (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/412,494

(22) PCT Filed: Jun. 20, 2013

(86) PCT No.: PCT/FR2013/051447
§ 371 (c)(1),
(2) Date: Jan. 2, 2015

(87) PCT Pub. No.: WO2014/006295
PCT Pub. Date: Jan. 9, 2014

(65) Prior Publication Data
US 2015/0189507 A1    Jul. 2, 2015

(30) Foreign Application Priority Data
Jul. 2, 2012 (FR) ...................... 12 56330

(51) Int. Cl.
*H04W 12/06* (2009.01)
*H04L 29/06* (2006.01)
*H04W 84/12* (2009.01)

(52) U.S. Cl.
CPC ............ *H04W 12/06* (2013.01); *H04L 63/162* (2013.01); *H04W 84/12* (2013.01)

(58) Field of Classification Search
CPC .......... H04L 63/00; H04L 63/04; H04L 63/06; H04L 63/062; H04L 63/08; H04L 63/0892; H04L 63/108; H04L 67/14; H04L 67/141; H04W 12/04; H04W 12/06; H04W 12/08
See application file for complete search history.

(56) References Cited

U.S. PATENT DOCUMENTS

2006/0253424 A1* 11/2006 Huang ................... H04L 9/0844
2007/0086590 A1* 4/2007 Blom ...................... H04L 63/06
380/278

(Continued)

FOREIGN PATENT DOCUMENTS

WO        2009068740 A1    6/2009

OTHER PUBLICATIONS

International Search Report dated Oct. 16, 2013 for corresponding International Application No. PCT/FR2013/051447, filed Jun. 20, 2013.

(Continued)

*Primary Examiner* — Eric W Shepperd
(74) *Attorney, Agent, or Firm* — David D. Brush; Westman Champlin & Koehler, P.A.

(57) ABSTRACT

A method is provided for implementing a security association for a terminal being attached to an access network. The method includes the following steps, carried out by an authentication server of the access network, after receiving a request coming from the terminal for attachment to the network: receiving a first message containing at least one security association parameter from a bootstrapping server function; authenticating the terminal by using at least one first authentication parameter provided by a home subscriber server of the terminal; and sending a security association message containing the at least one security association parameter to the authenticated terminal.

14 Claims, 5 Drawing Sheets

(56) References Cited

U.S. PATENT DOCUMENTS

| | | | |
|---|---|---|---|
| 2007/0086591 A1* | 4/2007 | Blom | H04L 63/0435 380/279 |
| 2007/0234041 A1* | 10/2007 | Lakshmeshwar | H04L 9/3271 713/156 |
| 2008/0160959 A1* | 7/2008 | Huang | H04L 63/0869 455/411 |
| 2008/0307518 A1* | 12/2008 | Holtmanns | H04L 63/12 726/12 |
| 2009/0117877 A1* | 5/2009 | Yang | H04L 63/06 455/411 |
| 2010/0115598 A1* | 5/2010 | Barriga | H04W 12/06 726/8 |
| 2010/0242100 A1* | 9/2010 | Korhonen | H04L 63/0884 726/5 |
| 2011/0004754 A1* | 1/2011 | Walker | H04L 9/3271 713/168 |
| 2011/0264913 A1* | 10/2011 | Nikander | H04L 63/0815 713/168 |
| 2011/0302627 A1* | 12/2011 | Blom | H04L 63/0492 726/2 |
| 2012/0222091 A1* | 8/2012 | Castellanos Zamora | H04W 12/06 726/3 |
| 2013/0007846 A1* | 1/2013 | Murakami | H04W 12/08 726/4 |
| 2013/0007858 A1* | 1/2013 | Shah | H04L 63/0815 726/6 |
| 2013/0084829 A1* | 4/2013 | De Foy | H04W 12/06 455/411 |
| 2013/0174241 A1* | 7/2013 | Cha | H04L 63/0815 726/7 |
| 2013/0232335 A1* | 9/2013 | King | H04L 63/062 713/155 |
| 2013/0239189 A1* | 9/2013 | Ionescu | H04W 12/06 726/6 |
| 2013/0298209 A1* | 11/2013 | Targali | H04L 63/0815 726/6 |
| 2014/0033282 A1* | 1/2014 | Bournelle | H04L 63/08 726/4 |
| 2014/0235211 A1* | 8/2014 | Suh | H04L 63/0815 455/411 |

OTHER PUBLICATIONS

"3rd Generation Partnership Project; Technical Specification group Services and System Aspects; Generic Authentication Architecture (GAA); Generic Bootstrapping Architecture (GBA) (Release 11)", 3GPP Standard 3GPP TS 33.220, 3rd Generation Partnership Project (3GPP) Mobile Competence Centre; 650, Route Des Lucioles; F-06921 Sophia-Antipolis Cedex; France, vol. SA WG3, No. V11.2.0, Mar. 16, 2012 (Mar. 16, 2012), pp. 1-91, XP050580312.

English translation of the Written Opinion of the International Searching Authority dated Jan. 2, 2015 for corresponding International Application No. PCT/FR2013/051447, filed Jun. 20, 2013.

French Search Report and Written Opinion dated Feb. 21, 2013 for corresponding French Application No. FR 1256330, filed Jul. 2, 2012.

* cited by examiner

| 1 | 2 | 3 | 4 |
|---|---|---|---|
| 01234567 | 01234567 | 01234567 | 01234567 |
| Code | Identifier | Length | |
| Type | Type-Data… | | |

Fig. 4A

| 1 | 2 | 3 | 4 |
|---|---|---|---|
| 01234567 | 01234567 | 01234567 | 01234567 |
| Code | Identifier | Length | |
| Type | Subtype | Reserved | |
| AttributeType | Length | Value… | |

Fig. 4B

| 1 | 2 | 3 | 4 |
|---|---|---|---|
| 01234567 | 01234567 | 01234567 | 01234567 |
| Code | Identifier | Length | |
| Type | Subtype | Reserved | |
| z | p | B-TID | |

Fig. 4C

IMPLEMENTING A SECURITY ASSOCIATION DURING THE ATTACHMENT OF A TERMINAL TO AN ACCESS NETWORK

CROSS-REFERENCE TO RELATED APPLICATIONS

This Application is a Section 371 National Stage Application of International Application No. PCT/FR2013/051447, filed Jun. 20, 2013, the content of which is incorporated herein by reference in its entirety, and published as WO 2014/006295 on Jan. 9, 2014, not in English.

FIELD OF THE DISCLOSURE

The field of the disclosure is that of telecommunications, and more particularly telecommunications by mobile networks.

BACKGROUND OF THE DISCLOSURE

The 3GPP standardization organization has defined an architecture called GBA ("Generic Bootstrapping Architecture") the aim of which is to allow the authentication of a mobile terminal so as to create a security association between the mobile terminal and an application. This architecture comprises a bootstrapping function server, termed BSF ("Bootstrapping Function Server") which serves as trusted third party allowing the establishment of a security association between the terminal and the application The authentication process used in this architecture is therefore effected in two stages, with a first process of authentication of the mobile terminal with the bootstrapping server BSF. This authentication phase makes it possible to establish between the terminal and the BSF a security association based on a shared key generated in the course of authentication. This shared key makes it possible thereafter to establish a security association between the terminal and an application having access to the BSF so as to retrieve the security hardware necessary for authenticating the terminal.

In the case where the mobile terminal seeks to connect via a non-3GPP access network, an additional step of attaching the terminal to the access network is performed beforehand, typically by using the EAP (Extensible Authentication Protocol) protocol, to authenticate the terminal so as to allow it to access the non-3GPP access network.

Figure 1:
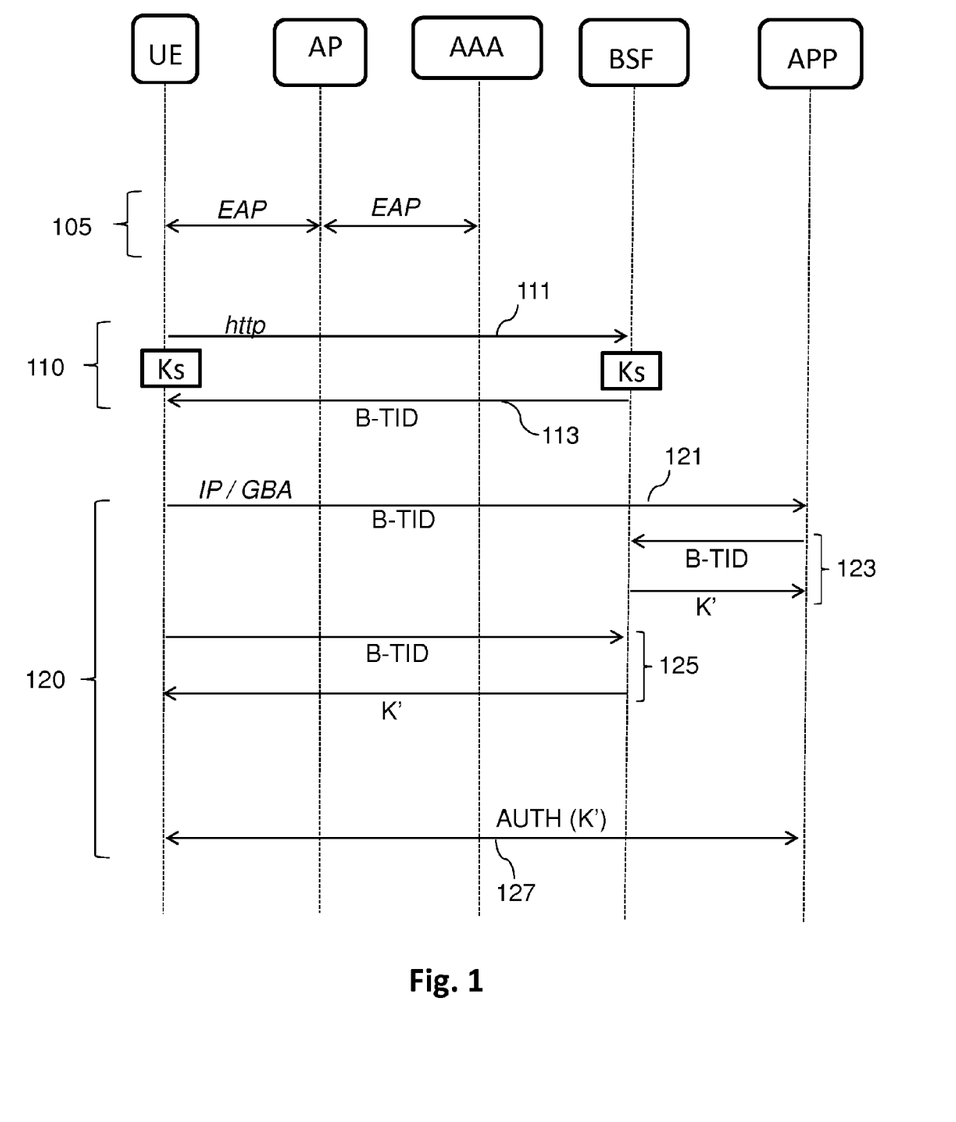

FIG. 1 illustrates this authentication process when a mobile terminal seeks to connect to an application via a non-3GPP access network.

In a first stage, the mobile terminal UE attaches to the non-3GPP access network, by addressing itself to an authentication server AAA/EAP by way of an access point AP of this network and by undertaking a first authentication using the EAP authentication protocol (step 105).

Once the terminal UE has attached to the non-3GPP access network, it can thereafter undertake a second authentication procedure with the GBA infrastructure. Thus, the terminal UE, furnished with a SIM card, authenticates itself firstly with a bootstrapping function server BSF (step 110), using a connection based on the http protocol (step 111).

The result of this authentication is a security key Ks, valid for a determined duration, provided by the bootstrapping server BSF. The bootstrapping server BSF also provides the terminal with a session identifier B-TID associated with the security key Ks, as well as the duration of validity of the key (step 113).

Subsequently, when the terminal desires to access an application APP, it authenticates itself mutually with this application APP (step 120), by opening a connection with this application APP (step 121), by indicating to this application that it desires to be authenticated according to the GBA technique, and by providing it with the session identifier B-TID.

The application APP then contacts the server BSF to provide it with the session identifier B-TID, and the server BSF responds to it by providing it with a new key K' derived from the security key and from the name of the application (step 123). The terminal performs the same operations on its side (step 125).

Thus the terminal and the application has one and the same key K' that they can use to authenticate themselves mutually and to secure the IP connection between them (step 127).

This authentication procedure therefore implies that the terminal opens its HTTP browser so as to be able thereafter to open an IP connection with the application, although this connection is not necessarily based on the HTTP protocol.

Moreover, the mobile terminal has previously authenticated itself with a server AAA of the access network, upon its attachment to the network, before authenticating itself with the bootstrapping server BSF. There is therefore dual-authentication of the mobile terminal, a first time upon its attachment to the network and then a second time to create a security association with the bootstrapping server BSF, thus giving rise to delays during access of the terminal to the application APP, increased complexity and increasing the message exchanges over the network.

SUMMARY

The aim of the present invention is to solve the drawbacks of the prior art by providing a method of setting up a security association, for a terminal attaching to an access network, in particular an access network of non-3GPP type, which requires only a single joint phase of attachment to the network and of security association.

According to a first aspect of the invention, there is proposed a method of setting up a security association for a terminal attaching to an access network, comprising the following steps, executed by an authentication server of the access network, subsequent to the receipt of a request for attachment to the network coming from the terminal:

reception, from a bootstrapping function server, of a first message containing at least one security association parameter;

authentication of the terminal by means of at least one first authentication parameter provided by a home subscriber server of this terminal; and dispatching to the authenticated terminal of a security association message containing the at least one security association parameter.

Thus, once this security association message has been received, the terminal is not only attached to the access network, but also has at its disposal a security association parameter, usable for mutual authentication with an application. The procedures for attachment to the network and for setting up a security association are therefore combined within a single procedure, thus reducing the signaling necessary in respect of these two operations.

In a first embodiment, the first message contains the first authentication parameter, obtained by the bootstrapping function server from the home subscriber server, thus allowing the authentication server to simultaneously retrieve the authentication and security association parameters, while minimizing the number of messages used.

According to an advantageous characteristic, at least one part of the security association parameter is determined by the bootstrapping function server as a function of at least one part of the first authentication parameter received from the home subscriber server, thus making it possible to use the first authentication parameters either for authentication of the terminal proper or for setting up the security association.

In another embodiment, the authentication server receives a second message containing the first authentication parameter of the home subscriber server, subsequent to the dispatching by the authentication server of a request for authentication to this home subscriber server, thus making it possible to decorrelate the processes of authentication and of setting up a security association.

According to an advantageous characteristic, at least one part of the security association parameter is determined by the bootstrapping function server as a function of at least one part of a second authentication parameter received from the home subscriber server. The authentication and the security association are therefore effected on the basis of distinct authentication parameters, thus strengthening the security of the process.

According to a particular characteristic of the invention, the at least one security association parameter is at least one parameter from among a secure-session identifier and a duration of validity of a secure session key. According to another particular characteristic of the invention, the at least one first authentication parameter is at least one parameter from among a random value, an identification parameter of the network and an expected response value when the terminal uses this random value to authenticate itself.

In an advantageous embodiment, the security association message is a message according to the EAP protocol comprising a data field containing the at least one security association parameter, so as to protect this security association parameter. In particular, the security association message is a message according to the EAP-AKA ("EAP Authentication and Key Agreement") protocol which can comprise a header according to the AKA authentication protocol before the data field containing the security association parameters.

According to another particular embodiment, the security association is a security association according to the GBA architecture. According to another particular embodiment, the access network is an access network of non-3GPP type.

According to another subject of the invention, there is proposed an authentication server adapted for setting up a security association for a terminal attaching to an access network, comprising a send-receive module able to receive a request, sent by the terminal, for attachment to this access network, this send-receive module being furthermore configured to:

receive, from a bootstrapping function server, a first message containing at least one security association parameter;

dispatch to the terminal a security association message containing this at least one security association parameter, subsequent to the authentication of the terminal by the authentication server by means of at least one first authentication parameter provided by a home subscriber server of this terminal.

This server presents advantages analogous to those of the method presented previously.

According to another subject of the invention, there is proposed a terminal, able to trigger the setting up of a security association upon its attachment to an access network, comprising a send-receive module adapted for:

dispatching a request for attachment to the access network to an access point of the access network;

receiving, from this access point, a message containing at least one first authentication parameter provided by a home subscriber server of the terminal;

dispatching, to the access point, a response containing a value calculated by the terminal on the basis of the at least one first authentication parameter;

receiving, from the access point, a security association message containing at least one security association parameter able to be used by the terminal to authenticate itself during a connection with an application.

In a particular embodiment, the various steps of the method according to the invention are determined by computer program instructions. Consequently, the invention is also aimed at a computer program on an information medium, this program being able to be implemented in a computer, this program comprising instructions suitable for the implementation of the steps of a method such as is described hereinabove. This program can use any programming language, and be in the form of source code, object code, or of code intermediate between source code and object code, such as in a partially compiled form, or in any other desirable form.

The invention is also aimed at an information medium readable by a computer, and comprising instructions of the computer programs such as mentioned hereinabove. The information medium can be any entity or device capable of storing the program. For example, the medium can comprise a storage means, such as a ROM ("Read-Only Memory"), for example a CD ROM or a microelectronic circuit ROM, or else a magnetic recording means, for example a diskette (floppy disk) or a hard disk. Moreover, the information medium can be a transmissible medium such as an electrical or optical signal, which can be conveyed via an electrical or optical cable, by radio or by other means. The program according to the invention can in particular be downloaded on a network of Internet type. Alternatively, the information medium can be an integrated circuit into which the program is incorporated, the circuit being adapted to execute or to be used in the execution of the method in question.

BRIEF DESCRIPTION OF THE DRAWINGS

Other characteristics and advantages will become apparent on reading preferred embodiments described with reference to the figures in which, in addition to FIG. 1 already discussed previously.

DETAILED DESCRIPTION OF ILLUSTRATIVE EMBODIMENTS

Figure 2:
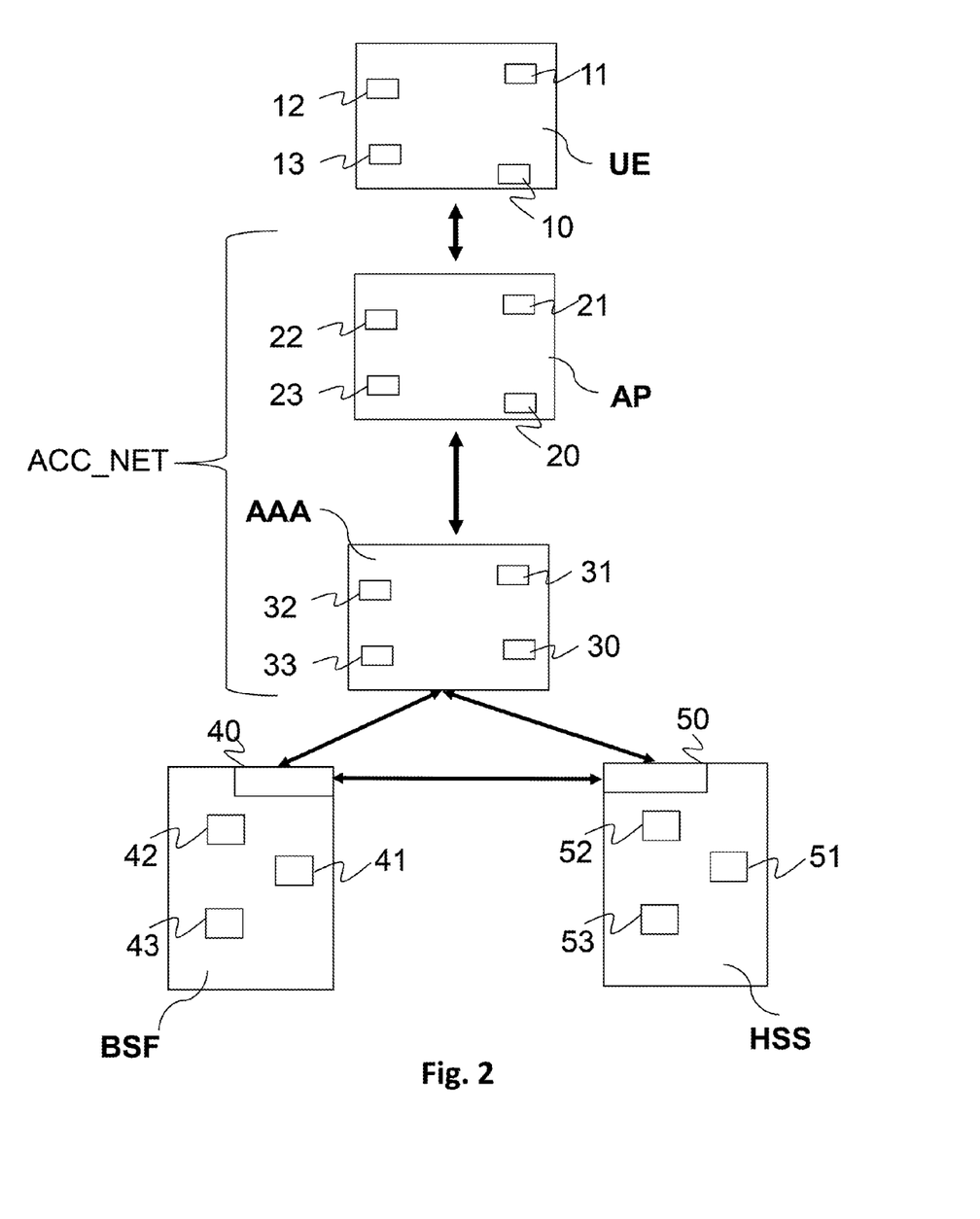
FIG. 2 represents in a schematic manner the items of equipment of a mobile telecommunication network involved in the present invention.

Reference is made firstly to FIG. 2 which represents in a schematic manner the items of equipment of a mobile telecommunication network which are involved in the present invention.

The items of equipment implementing the invention are a mobile terminal UE, a network access point AP and an authentication server AAA, both of which belong to an access network ACC_NET, a bootstrapping function server BSF and a subscriber server HSS.

The invention is advantageously implemented in respect of access via an access network of non-3GPP type, such access being of WiFi type (i.e. according to an IEEE 802.11x standard), WiMax type (i.e. according to an IEEE 802.16x standard) or according to a VPN (Virtual Private Network) mode of connection, using for example the IKEv2 ("Internet Key Exchange Protocol version 2") protocol.

Thus, in an embodiment where access to the access network ACC_NET is effected according to the WiFi standard, the network access point AP is a WiFi access gateway or a router. In one embodiment where this access is effected according to the WiMax standard, the network access point AP is a WiMax base station. Finally, in an embodiment where the access is effected according to a VPN mode of connection, the network access point AP is a VPN server.

The mobile terminal UE can be, for example, a mobile telephone terminal, a laptop computer, a digital personal assistant, or the like. In the example represented the mobile terminal UE is a mobile telephone terminal belonging to a user.

As represented this FIG. 2, the mobile terminal UE comprises a send-receive module 10 configured to send and receive data in particular to and from the network access point AP. It also comprises a processor 11, a random-access memory 12 and a read-only memory 13.

The network access point AP of the access network ACC_NET is a unit comprising a processor 21, a random-access memory 22 and a read-only memory 23, as well as a send-receive module 20 (typically one or more antenna(s)) configured to communicate with the mobile terminal UE and the authentication server AAA.

The authentication server AAA of the access network ACC_NET exhibits the conventional structure of a computer. It comprises a processor 31, a random-access memory 32 and a read-only memory 33. It comprises a send-receive module 30 configured to communicate with network access point AP, the bootstrapping function server BSF and the subscriber server HSS.

This authentication server AAA is in particular adapted for setting up a security association, for example of GBA type, for a terminal seeking to attach to the access network ACC_N ET.

Accordingly, its send-receive module 30 can receive a request for attachment to the network coming from the terminal, can send a request for security association to the bootstrapping function server BSF, subsequent to the receipt of such a request for attachment to the network, can receive a first, so-called security association response, message comprising security association parameters and optionally authentication parameters, from the bootstrapping function server, and can dispatch to the terminal a security association message comprising the parameters of security association with the terminal, if the latter is successfully authenticated, so as to signify to this terminal that it is indeed attached to the network and authenticated by the bootstrapping function server BSF.

The bootstrapping function server BSF also exhibits the conventional structure of a computer. It comprises a processor 41, a random-access memory 42 and a read-only memory 43. It comprises a send-receive module 40 configured to communicate with the authentication server AAA and the subscriber server HSS.

The subscriber server HSS also exhibits the conventional structure of a computer. It comprises a processor 51, a random-access memory 52 and a read-only memory 53. It comprises a send-receive module 50 configured to communicate with the authentication server AAA and the bootstrapping function server BSF, in particular so as to dispatch authentication parameters to them on request by them. This subscriber server HSS can in particular be a centralized database hosting the data of the user profile associated with the mobile terminal UE. When this user profile supports a security association (for example of GBA type), then the server HSS also stores an indication of this characteristic.

Figure 3A:
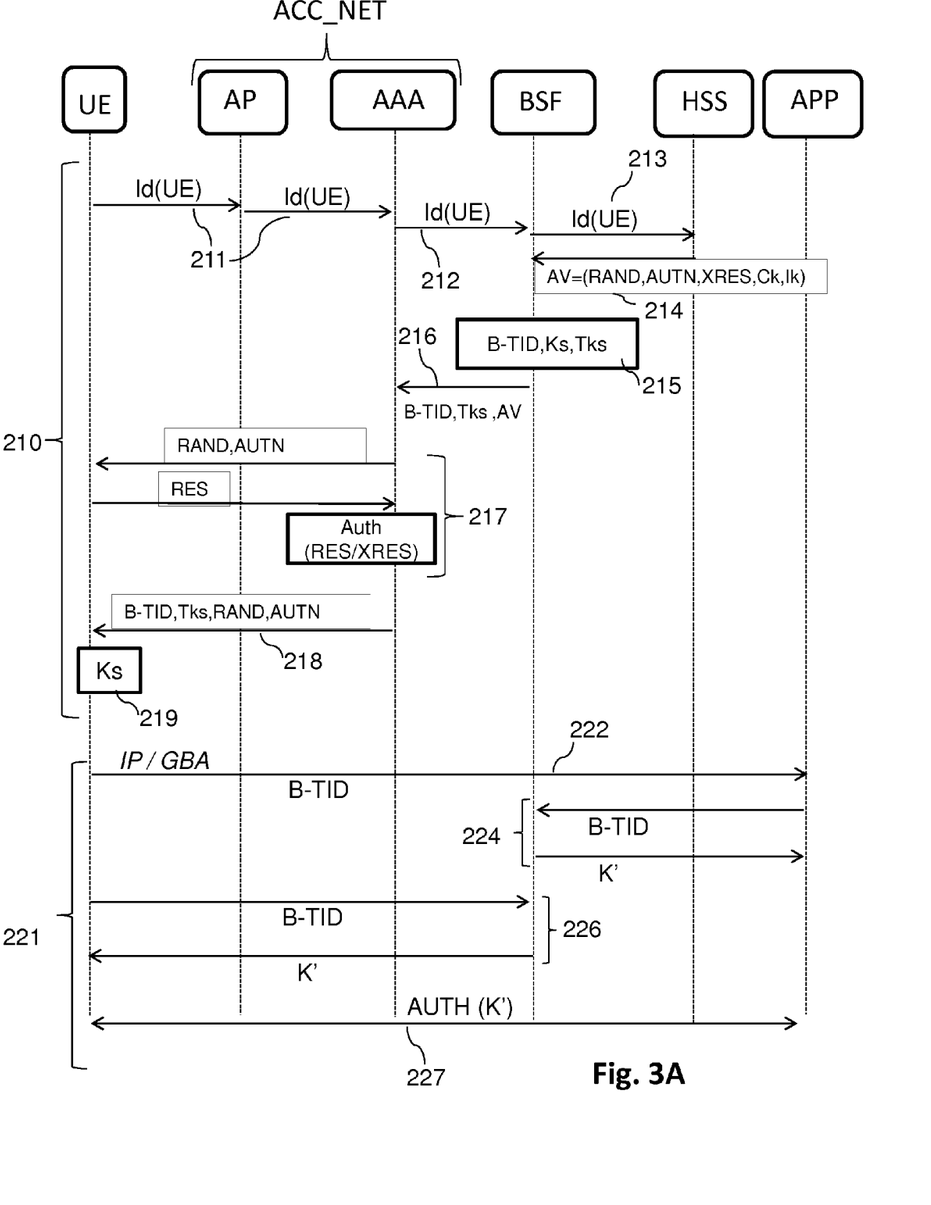
FIG. 3A represents the steps of a method of setting up a security association for a terminal, according to a first embodiment of the invention.

Reference is now made to FIG. 3A, which illustrates a method of setting up a security association for a mobile terminal UE attaching to the access network ACC_NET, according to a first embodiment of the present invention.

The method illustrated in this FIG. 3A comprises a first combined phase 210 of authentication and of setting up of a security association, upon the attachment of the terminal UE to the network ACC_NET, followed by a second phase 221 of connection of the mobile terminal UE to an application APP by means of security association parameters defined during this security association.

The security association employed in this method is typically a security association of GBA (Generic Bootstrapping Architecture) type between the mobile terminal UE and any application APP relying on this GBA technique to authenticate this mobile terminal.

In the course of the first phase 210, the mobile terminal UE requests firstly its attachment with the access network ACC_NET (for example by means of a client module installed on this terminal UE), by dispatching a request for attachment to the network access point AP of this access network (step 211).

This attachment request can in particular contain a unique identifier Id(UE), for example the international mobile subscriber identity IMSI of the user of the mobile terminal UE.

This attachment request is redirected, by the access point AP, to the authentication server AAA of this access network (step 211), so that the latter can process this request.

Subsequent to the receipt of this attachment request transmitted by the access point AP, the server MA then triggers the process of authentication of the terminal UE, by dispatching a security association request to the bootstrapping function server BSF (step 212), this request containing the identifier Id(UE) of the terminal UE. This request for security association can be formatted according to the Diameter protocol or the MAP protocol.

Subsequent to the receipt of this request for security association coming from the authentication server AAA, the bootstrapping function server BSF can verify that the unique identifier Id(UE) of the user of the mobile terminal UE exists and is entitled to the security association service. It then interrogates the home subscriber server HSS of this terminal UE, so as to retrieve authentication parameters associated with the user of this terminal.

Accordingly, the bootstrapping function server BSF dispatches (step 213) an authentication request containing the identifier Id(UE) of the subscriber user of the terminal UE.

Subsequent to the receipt of this authentication request, the home subscriber server HSS returns (step 214) one or more authentication parameter(s), as well as optionally GUSS ("Generic User Security Settings") information to the bootstrapping function server BSF which stores same.

In particular, these authentication parameters can take the form of an authentication vector AV comprising a random value RAND generated by the subscriber server HSS, an authentication token for the network AUTN making it possible to authenticate the network, a value XRES of expected response when the terminal uses the random value RAND to authenticate itself, an encryption key Ck calculated on the basis of this random value RAND and an integrity key Ik also calculated on the basis of this random value RAND. Stated otherwise, the authentication vector AV=(RAND,AUTN, XRES, Ck,Ik) is returned by the home subscriber server HSS to the bootstrapping function server BSF.

The bootstrapping function server BSF thereafter generates at least one session association parameter, in particular a session identifier B-TID and a duration of session Tks associated with a session key Ks (step 215). In particular, this session key Ks can be generated on the basis of certain of the authentication parameters received from the home subscriber server HSS, for example by concatenating the keys Ik and Ck of the previously introduced authentication vector AV.

The bootstrapping function server BSF thereafter dispatches a first, so-called security association response, message to the authentication server AAA containing the session association parameter(s) (e.g. the session identifier B-TID and the duration of validity Tks of the session key Ks) generated by the server BSF (step 216).

In the embodiment of FIG. 3A, this security association response message also contains, from among the set of authentication parameters received from the server HSS, at least the authentication parameters serving to authenticate the terminal UE with the authentication server AAA, that is to say the random value RAND, the token AUTN and the value XRES.

This security association response message can thus contain the whole of the authentication vector AV=(RAND, AUTN,XRES,Ck,Ik), the keys Ck and Ik being able to be used by the authentication server AAA to secure the access session after authentication as well as to derive other keys transmitted for access.

Subsequent to the receipt of this first message, the authentication server AAA can undertake the authentication of the terminal UE (step 217), by virtue in particular of the random value RAND, the authentication token AUTN and the value XRES. The authentication server AAA performs this procedure for authenticating the terminal UE by dispatching the RAND and the token AUTN to it in a first stage. The terminal UE authenticates the network by virtue of the token AUTN. If authentication of the network is successfully concluded, the terminal UE thereafter calculates an authentication response value RES on the basis of the random value RAND received from the authentication server AAA, and returns this value RES to the authentication server AAA. By comparing the values RES and XRES, the authentication server MA can then authenticate the response of the terminal UE.

If the terminal UE is successfully authenticated by the authentication server AAA (that is to say when the value RES is equal to the value XRES), the authentication server AAA transmits thereafter (step 218) to the terminal UE a security association message containing the security association parameter(s) (e.g. the session identifier B-TID as well as the duration of validity Tks of the session key Ks).

This security association message can advantageously furthermore contain certain of the authentication parameters, in particular the random value RAND, used to retrieve the session key Ks from the terminal UE (step 219). In this case, this random value RAND is used to calculate the keys Ck and Ik according to the same procedure as at the level of the server HSS, and the session key Ks is deduced from these keys Ck and Ik in the same manner as at the level of the server BSF.

This security association message can also advantageously contain the token AUTN, thus making it possible to be able to interrogate the SIM card of the terminal UE when the implementation of this terminal so demands.

At this juncture, the terminal UE is attached to the access network ACC_NET with which it has authenticated itself and furthermore has at its disposal a security association that it can use to connect to applications relying on this security association.

The user of the terminal UE can then connect to the application APP, by virtue of the session identifier B-TID, during a connection phase 221 similar to the phase 120 described previously in conjunction with FIG. 1. In particular, steps 222 to 227 of this connection phase 221 are respectively similar to those 121 to 127 of the connection phase illustrated in FIG. 1.

Thus, the procedure for attachment of the terminal UE to the access network ACC_NET and the procedure for security association between this terminal UE and applications allowing mutual authentication by means of the session identifier B-TID are combined within one single procedure, so as to decrease the signaling between the various entities of the network described in FIG. 2 and to simplify the use of the security association procedure.

Figure 3B:
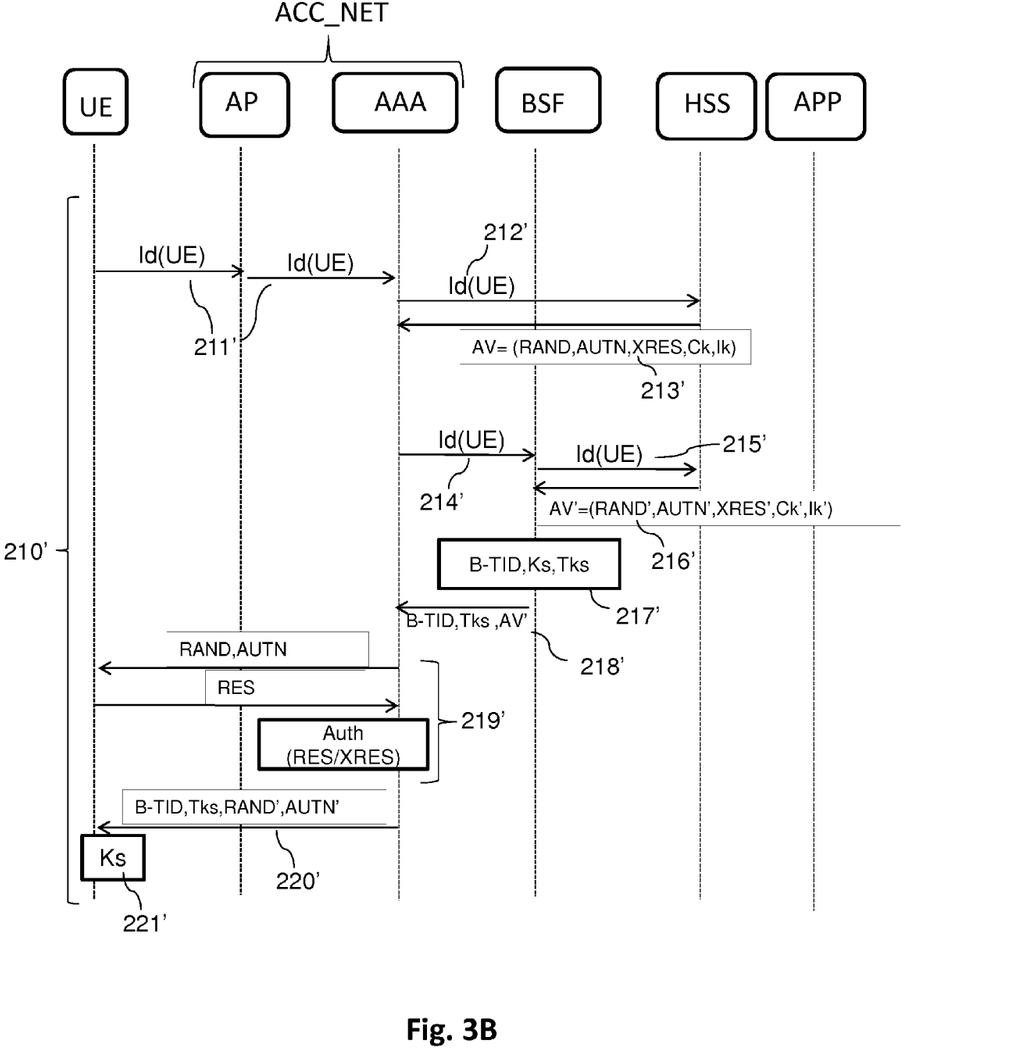
FIG. 3B represents the steps of a method of setting up a security association for a terminal, according to a second embodiment of the invention.

Reference is now made to FIG. 3B, which illustrates another embodiment of the method of setting up a security association for a mobile terminal UE attaching to the access network ACC_N ET.

In this other embodiment, the method implements a first combined phase 210' of authentication and of setting up of a securities association which is distinguished from the first phase 210, described previously in conjunction with FIG. 3A, in that the authentication of the terminal for access to the network ACC_NET is decorrelated from the security association procedure.

This first phase 210' thus commences with the dispatching (step 211') of a request for attachment of the terminal UE to the network access point AP of the network ACC_NET, which request is redirected by this access point AP toward the authentication server AAA of this network ACC_NET so that the latter can process this request, similarly to step 211 described previously.

Subsequent to the receipt of this attachment request transmitted by the access point AP, the server MA then triggers the process of authentication of the terminal UE, by dispatching a request for authentication to the home subscriber server HSS of the terminal UE (step 212'), this request containing the identifier Id(UE) of the terminal UE making it possible to retrieve in return (step 213') one or more first authentication parameter(s) that the authentication server stores in memory and subsequently uses to undertake the authentication of the terminal UE by the network ACC_NET. In particular, these first authentication parameters can be in the form of a first authentication vector AV=(RAND,AUTN,XRES,Ck,Ik) such as introduced previously.

In parallel with this authentication process (that is to say before, after or simultaneously with, this authentication process), the authentication server AAA triggers the security association process by dispatching a security association request to the bootstrapping function server BSF (step 214'), which request also contains the identifier Id(UE) of this subscriber user.

Subsequent to the receipt of this request, the bootstrapping function server BSF interrogates the home subscriber server HSS of the terminal UE (step 215'), by dispatching to it an interrogation request containing the identifier Id(UE), so that the latter returns to it (step 216') a response message containing one or more second authentication parameter(s).

These authentication parameters comprise in particular a second random value RAND' generated by the server HSS, an encryption key Ck' calculated on the basis of this random value RAND' and an integrity key Ik' also calculated on the basis of this random value RAND', so as to allow either the generation of a session key Ks by the server BSF or the retrieval of this session key Ks by the terminal UE. A token AUTN' can also be transmitted so as to be able to interrogate the SIM card of the terminal UE when the implementation of this terminal so demands.

In a particular embodiment, the home subscriber server HSS returns a message containing a second authentication vector AV' comprising the set of these various authentication parameters, as well as a value XRES' of expected result when the terminal UE authenticates itself with the random value RAND', in which case AV'=(RAND',AUTN',XRES', Ck',Ik').

The bootstrapping function server BSF stores these second authentication parameters after having received them and can generate at least one security association parameter, in particular a session identifier B-TID and a session key Ks, as well as a duration of validity Tks associated with this session key Ks, similarly to what is done in the first embodiment (step 217'). In particular, the session key Ks can be generated on the basis of the keys Ik' and Ck' of the second authentication vector AV', by concatenating them for example.

Thus, in this second embodiment, the session key Ks is obtained on the basis of different authentication parameters from those used for the process of authentication of the terminal, this being advantageous in terms of security.

The bootstrapping function server BSF thereafter dispatches (step 218') a message to the authentication server AAA containing the security association parameter(s) (e.g. the session identifier B-TID and the duration Tks of validity of the session key Ks).

Once this message has been received, the authentication server AAA can initiate the process of authentication (step 219') of the terminal UE with the aid of the first authentication parameters RAND, AUTN and XRES stored during step 213', similarly to the authentication process 217 already described.

When the terminal UE is successfully authenticated by the authentication server AAA (that is to say when the terminal UE returns a value RES equal to the expected result value XRES), the authentication server MA then transmits (step 220') to the terminal UE a security association message containing the security association parameter(s), e.g. the session identifier B-TID and the duration Tks of validity of the key Ks.

This security association message furthermore advantageously contains certain of the second authentication parameters, in particular the random value RAND' making it possible to retrieve the session key Ks from the terminal UE (step 221'). Thus, this random value RAND' is used to calculate the keys Ck' and Ik' according to the same procedure as at the level of the server HSS, the session key Ks being deduced from these keys Ck' and Ik' in the same manner as at the level of the server BSF.

In an advantageous embodiment, use is made of the EAP protocol in the messages exchanged between the entities implemented in this method, and in particular between the user terminal UE, the access point AP and the authentication server AAA, so as to ensure that the data exchanged in these messages are protected.

Figure 4A:
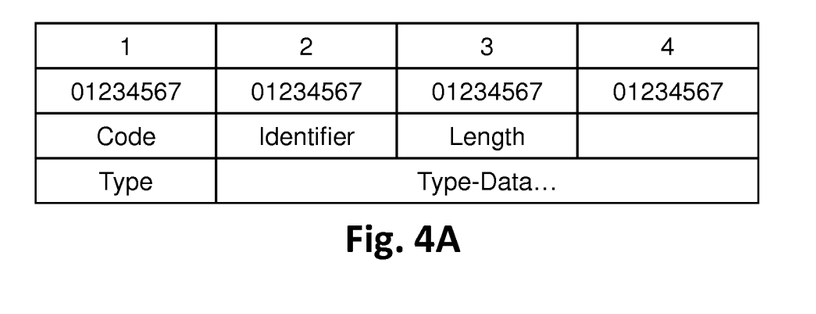
FIGS. 4A to 4C illustrate the use of data packets according to the EAP protocol in an advantageous embodiment of the invention.

As specified in the RFC 3748 standard, the data packets according to the EAP protocol begin with a header formed of several fields: "Code" field, "Identifier" identification field, "Length" length field, "Type" field, followed by another field "Type-Data" containing information specific to the authentication protocol. Such a header, specific to the EAP protocol, is illustrated in FIG. 4A.

Figure 4B:
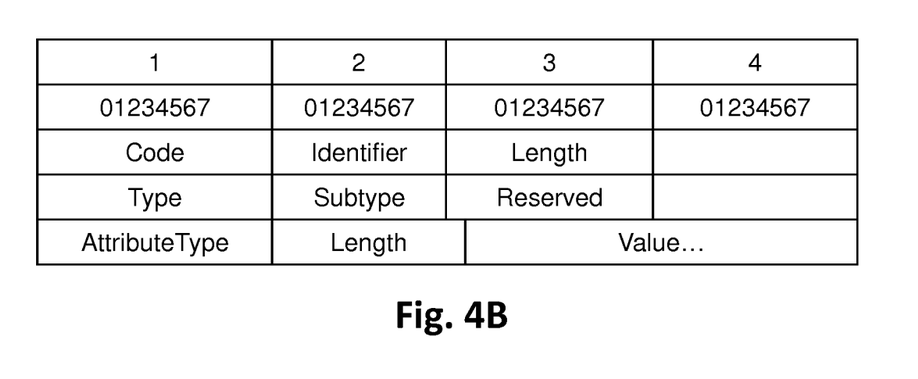

In the particular case of an EAP-AKA protocol, the "Type-Data" field begins with a specific header comprising a byte indicating the sub-type, and then a reserved byte. The rest of the message contains attributes in the form Type-Length-Value (TLV). Such a header, specific to the EAP-AKA protocol, is illustrated in FIG. 4B.

This format of packets can advantageously be employed, in the present invention, to define new specific attributes making it possible to convey the following parameters to the terminal UE:

The random value RAND provided by the subscriber server HSS;

The parameter AUTN making it possible to authenticate the network, also provided by the home subscriber server HSS;

The session identifier B-TID generated by the bootstrapping server BSF;

The duration Tks of validity of the session key Ks, also calculated by the bootstrapping server BSF.

The following attributes x to z can thus be defined as hereinbelow, so as to convey each of the parameters respectively indicated hereinabove:

Attribute Type: x/Length: n/Value: GBA RAND value
Attribute Type: y/Length: m/Value: GBA AUTN value
Attribute Type: z/Length: p/Value: B-TID value
Attribute Type: w/Length: q/Value: session keylifetime value Depending on the embodiment, the parameters RAND and AUTN are optional.

Figure 4C:
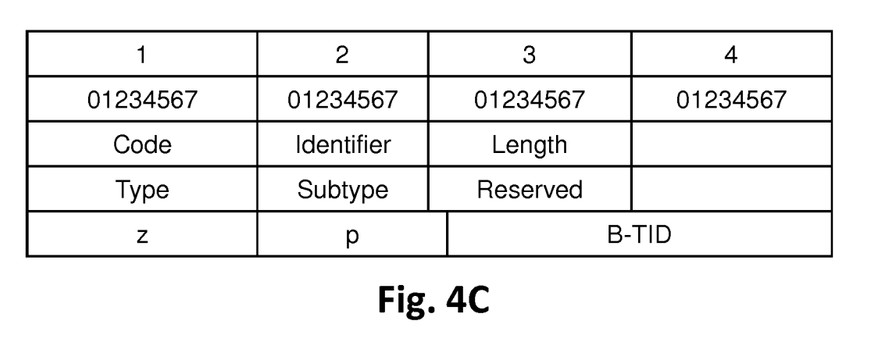

FIG. 4C thus illustrates a packet shaped according to this EAP-AKA protocol in the particular case of the transport of a security association parameter B-TID, using an attribute of type z, of length p, with the parameter B-TID as value.

Thus, in this embodiment, a client module according to the EAP protocol is installed in the mobile terminal UE, so that the latter can, on the one hand, format its request for attachment to the network ACC_NET according to this EAP protocol, by inserting its identity Id(UE) into a data field of a packet formatted according to this EAP protocol, such as illustrated in FIG. 4A or 4B.

Furthermore, this client module EAP is configured to interpret an attachment message formatted according to the EAP protocol when it is received by the mobile terminal UE originating from the authentication server AAA, so as to retrieve one of the previously mentioned association parameters, for subsequent use upon connection to an application APP.

This client module EAP can take the form of a software module stored in one of the memories 12 or 13 of the terminal UE and implemented by the processor 11 of this terminal UE.

In this embodiment, a server module according to the EAP protocol is also installed in the authentication server AAA, so that the latter can, on the one hand, interpret the attachment request emanating from the terminal UE and, on the other hand, format the security association message containing the security association parameter(s) according to this EAP protocol, such as is illustrated in FIG. 4A or 4B. This server module EAP can take the form of a software module stored in one of the memories 32 or 33 of the authentication server AAA and implemented by the processor 31 of this server.

Of course, the invention is not limited to the exemplary embodiments hereinabove described and represented, on the basis of which it will be possible to envisage other modes and other embodiments, without however departing from the scope of the invention.

Thus, the EAP and EAP-AKA protocols were specifically mentioned for formatting the attachment requests and the security association message that are exchanged between the terminal UE and the authentication server AAA. However, other protocols making it possible to protect the security association parameters exchanged between these entities may be employed, such as for example the EAP-SIM, EAP-TILS or EAP-AKA' protocols.

Furthermore, it was indicated previously that the invention is particularly advantageous when the access network ACC_NET is a network of non-3GPP type. The invention is not limited, however, to this type of access network alone.

Finally, a security association of GBA type was mentioned previously within the framework of the authentication of a terminal UE with a bootstrapping function server BSF both of which support this type of association. However, the invention is not limited, however, to this type of security association alone and may apply to other forms of security association supported by a terminal and a bootstrapping function server, such as for example a security association according to the Digest protocol.

Although the present disclosure has been described with reference to one or more examples, workers skilled in the art will recognize that changes may be made in form and detail without departing from the scope of the disclosure and/or the appended claims.

The invention claimed is:

1. A method of setting up a security association for a terminal attaching to an access network, wherein the method comprises the following acts, executed by an authentication server of the access network, subsequent to reception of a request for attachment to the network coming from the terminal:
reception, from a bootstrapping function server, of a first message containing at least one security association parameter;
authentication of the terminal by using at least one first authentication parameter provided by a home subscriber server of said terminal; and
dispatching to the authenticated terminal a security association message containing said at least one security association parameter.

2. The method as claimed in claim 1, wherein the first message contains said first authentication parameter, obtained by the bootstrapping function server from the home subscriber server.

3. The method as claimed in claim 2, wherein at least one part of said security association parameter is determined by the bootstrapping function server as a function of at least one part of said first authentication parameter received from the home subscriber server.

4. The method as claimed in claim 1, wherein the authentication server receives a second message containing the first authentication parameter of the home subscriber server subsequent to the dispatching by the authentication server of a request for authentication to said home subscriber server.

5. The method as claimed in claim 4, wherein at least one part of said security association parameter is determined by the bootstrapping function server as a function of at least one part of a second authentication parameter received from the home subscriber server.

6. The method as claimed in claim 1, wherein the at least one security association parameter is at least one parameter from among a secure-session identifier and a duration of validity of a secure session key.

7. The method as claimed in claim 1, wherein the at least one first authentication parameter comprises at least one parameter from among a random value, an identification parameter of the network and an expected response value when the terminal uses said random value to authenticate the terminal.

8. The method as claimed in claim 1, wherein the security association message is a message according to the Extensible Authentication Protocol (EAP) comprising a data field containing said at least one security association parameter.

9. The method as claimed in claim 1, wherein the security association message is a message according to the Extensible Authentication Protocol-Authentication and Key Agreement (EAP-AKA) comprising a header according to the AKA authentication protocol before a data field containing said at least one security association parameter.

10. The method as claimed in claim 1, wherein the security association is a security association according to the Generic Bootstrapping Architecture (GBA).

11. The method as claimed in claim 1, wherein the access network is an access network of non-$3^{rd}$ Generation Partnership Protocol type.

12. An authentication server adapted for setting up a security association for a terminal attaching to an access network, comprising:
a non-transitory computer-readable memory storing instructions; and
a processor configured by the instructions to perform acts comprising:
receiving a request, sent by the terminal, for attachment to said access network;
receiving, from a bootstrapping function server, a first message containing at least one security association parameter; and
dispatching to the terminal a security association message containing said at least one security association parameter, subsequent to authentication of said terminal by the authentication server, by using at least one first authentication parameter provided by a home subscriber server of said terminal.

13. A terminal able to trigger setting up a security association by an authentication server upon attachment of the terminal to an access network (ACCNET), comprising:
a non-transitory computer-readable memory storing instructions; and
a processor configured by the instructions to perform acts comprising:
dispatching a request for attachment to said access network to said authentication server, via an access point of said access network;
receiving, from said authentication server, via said access point, a message containing at least one first authentication parameter provided by a home subscriber server of the terminal;
dispatching, to said authentication server, via said access point, a response containing a value calculated by the terminal on the basis of the at least one first authentication parameter;

receiving, from said authentication server, via said access point, a security association message containing at least one security association parameter provided by a bootstrapping function server and able to be used by the terminal to authenticate the terminal during a connection with an application.

14. A non-transmissible recording medium, readable by a computer, on which is recorded a computer program comprising instructions for execution of a method of setting up a security association for a terminal attaching to an access network, wherein the method comprises the following acts, executed by an authentication server of the access network, subsequent to reception of a request for attachment to the network coming from the terminal:

reception, from a bootstrapping function server, of a first message containing at least one security association parameter;

authentication of the terminal by using at least one first authentication parameter provided by a home subscriber server of said terminal; and dispatching to the authenticated terminal a security association message containing said at least one security association parameter.

\* \* \* \* \*